May 9, 1967

W. G. YAX 3,318,218

MULTIPLE-IMAGE DEVICE

Filed Jan. 28, 1966

INVENTOR.
WILLIAM G. YAX
BY
Gammwitz & Carr
ATTORNEYS.

May 9, 1967 W. G. YAX 3,318,218
MULTIPLE-IMAGE DEVICE
Filed Jan. 28, 1966 3 Sheets-Sheet 2
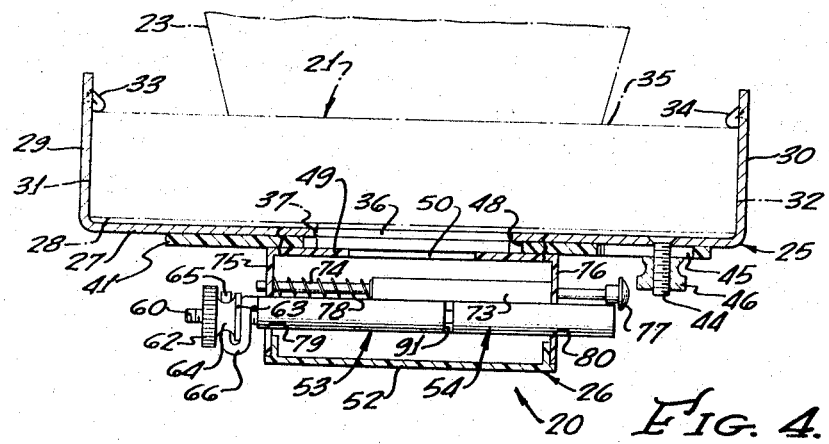
FIG. 4.
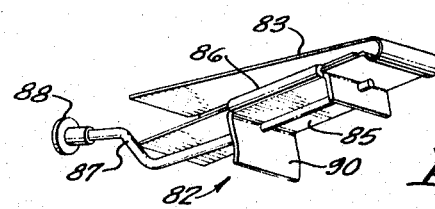
FIG. 5.
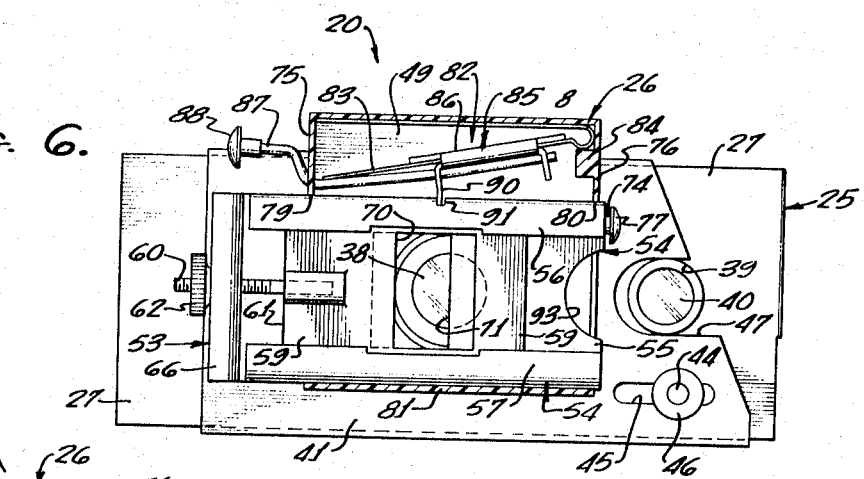
FIG. 6.
FIG. 7.
INVENTOR.
WILLIAM G. YAX
BY
Gausewitz & Carr
ATTORNEYS.

May 9, 1967 W. G. YAX 3,318,218
MULTIPLE-IMAGE DEVICE
Filed Jan. 28, 1966 3 Sheets-Sheet 3

INVENTOR.
WILLIAM G. YAX
BY
ATTORNEYS.

United States Patent Office 3,318,218
Patented May 9, 1967

3,318,218
MULTIPLE-IMAGE DEVICE
William G. Yax, 478 W. Baker Ave.,
Fullerton, Calif. 92632
Filed Jan. 28, 1966, Ser. No. 523,620
8 Claims. (Cl. 95—36)

This invention pertains to a device by which an object may be made to appear two or more times in a single photographic picture.

The device of this invention is particularly adapted for use as an auxiliary attachment to be applied to a camera when multiple-image pictures are to be taken. When used, it causes different portions of a single photographic plate or film to be exposed successively, permitting an object to be positioned in different places so as to appear more than once in the resulting photograph. The background and all other portions of the picture are entirely conventional in appearance.

The multiple-image device includes a support that resiliently grips the side edge portions of the forward face of the camera, positioning the operative mechanism of the device exteriorly of the camera in front of the lens. The device includes a housing carried by the support within which is a linearly slidable mask which can assume two predetermined positions relative to the housing. It is moved in one direction against a spring force to where a detent locks the mask in position. An opening through the mask allows exposure of one half of the lens when the shutter is tripped, while the other half is blocked by the mask. Upon release of the detent, the slidable mask moves by the spring to its alternate position in which the exposed and blocked portions of the lens are reversed. In other words, the portion that first was exposed now is blocked, while the other half of the lens is exposed. The shutter then is tripped in the second of the two positions of the mask in securing the multiple-image picture. A fine adjustment may be included to assure that the aperture in the mask is positioned where there will be no line of demarcation between the two successively exposed portions in the resulting photograph. Also, the housing containing the slidable mask may be positioned relative to the support such that unequal portions of the lens are blocked in the two positions of the sliding mask. Thus, the multiple-image picture need not be evenly split, but may have one section greater than half of the width of the photograph and the other section of less than half. In any event, the same person, animal or object may appear in both sections of the photograph with no visible indication between the sections that the multiple-image device has been used.

An object of this invention is to provide an improved multiple-image device for cameras.

Another object of this invention is to provide a multiple-image device where no line of demarcation will appear between the different sections of the resulting picture.

A futher object of this invention is to provide a multiple-image device readily attachable to the exterior of a camera.

A still further object of this invention is to provide a multiple-image device that will not interfere with the operation of the camera, in particular with the electric eye of cameras having such a means of controlling the shutter.

Yet another object of this invention is to provide a multiple-image device in which it is possible to vary the proportions of the film exposed in the successive operations of the camera shutter.

An additional object of this invention is to provide a multiple-image device in which the opening through the mask is adjustable.

These and other objects will become apparent from the following detailed description taken in connection with the accompanying drawings in which:

FIGURE 4 is a longitudinal sectional view taken along line 4—4 of FIGURE 2;

FIGURE 5 is a perspective view of the detent assembly removed from the remaining components of the device;

FIGURE 6 is a view similar to FIGURE 2 but with the slider assembly in its alternate position;

FIGURE 7 is a sectional view taken along line 7—7 of FIGURE 6;

Figures 1, 2, 3:
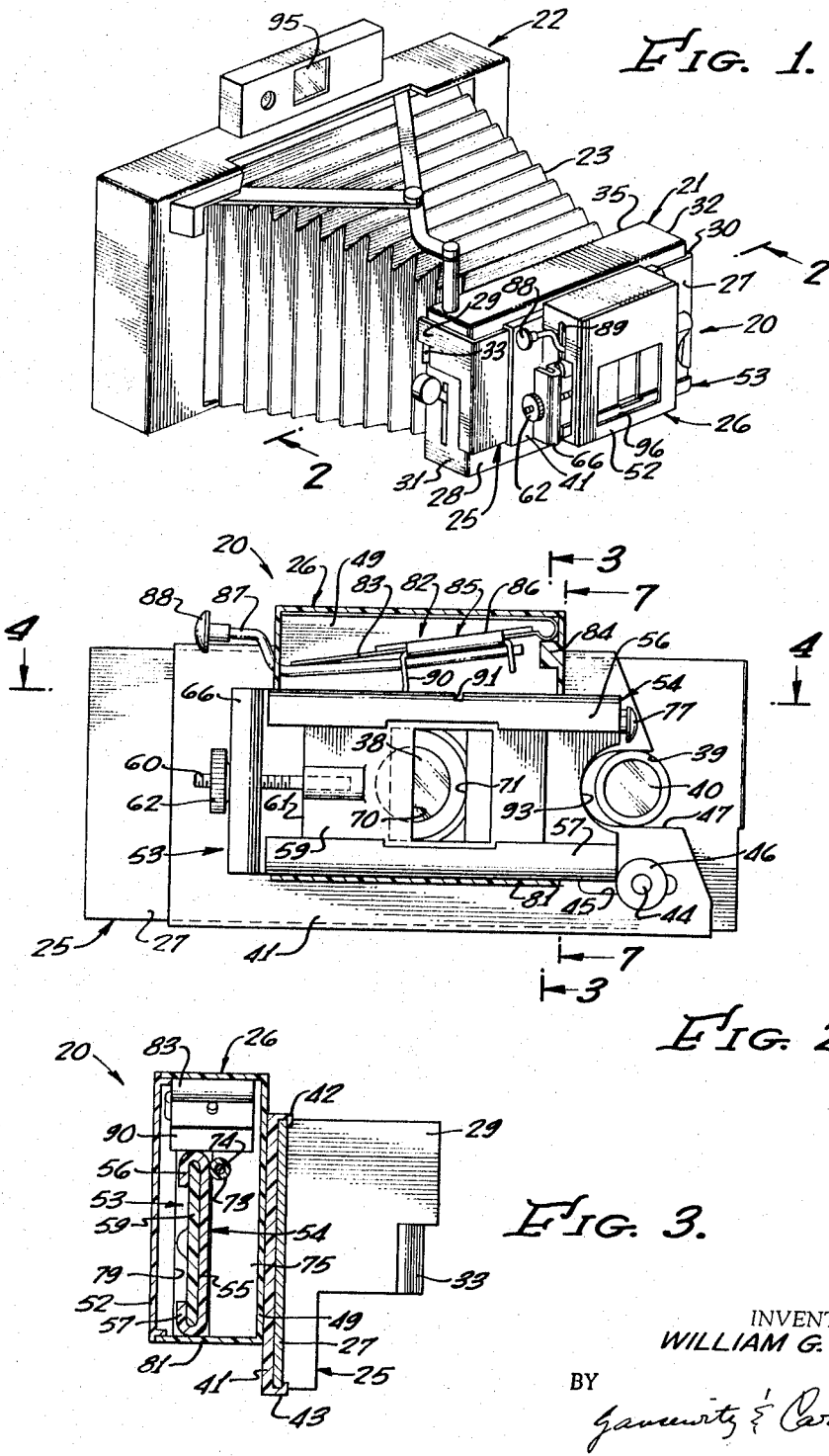
FIGURE 1 is a perspective view of the multiple-image device of this invention attached to a camera.
FIGURE 2 is a longitudinal sectional view taken along line 2—2 of FIGURE 1.
FIGURE 3 is a transverse sectional view taken along line 3—3 of FIGURE 2.

With reference to the drawing, the multiple-image device 20 of this invention is illustrated in FIGURE 1 in its operative position secured to the forward lens-carrying portion 21 of a camera 22. The forward portion 21 will have been extended outwardly as the bellows 23 of the camera are expanded, and the camera is thereby made ready for taking a picture. The camera should be firmly supported during use of the device of this invention, and so will be mounted on a tripod or the like, not shown.

The multiple-image device 20 includes a support 25 that carries a housing 26. The support is a substantially U-shaped member, as viewed in top plan, with the central portion 27 extending over the front face 28, and the outer legs 29 and 30 extending around the side edges 31 and 32 of the forward section 21 of the camera.

Inwardly bent retainer tabs 33 and 34 are provided on the legs 29 and 30 of the support 25, which snap in place behind the side edges of the rear wall 35 of the forward section 21 of the camera, as best seen in FIGURE 4. This holds the support 20 on the camera, properly located with respect to the camera apparatus. The central portion 27 of the support 25 includes an opening 36 that circumscribes the sunshade 37 of the camera outwardly of the lens 38. Also, the support 25 has a smaller opening 39 in the central portion 27, to one side of the opening 36, to allow light to impinge upon the lens 40 of the electric eye control of the camera which, in turn, governs the action of the camera shutter.

A flat plate 41 fits over the central portion 27 of the support 25, having flanges 42 and 43 that extend over the top and bottom edges of the support to attach the plate 41 to the support while permitting longitudinal sliding movement in a direction transverse to the lens 38. A stud 44 is carried by the support 26 and projects outwardly through a longitudinal slot 44 in the plate 41, a knurled nut 46 being threaded onto the outer end of the stud. Hence, by tightening the nut 46, the plate 41 may be locked in a selected position longitudinally of the support.

Figure 10:
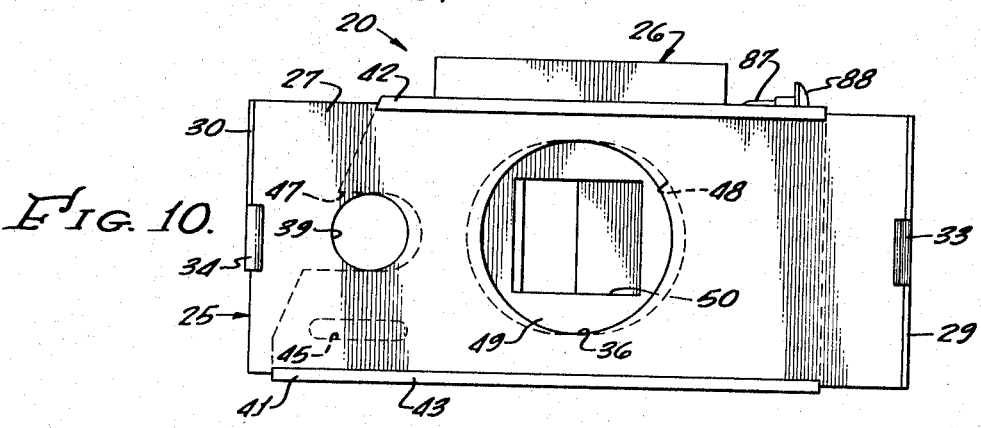
FIGURE 10 is a rear elevational view of the multiple-image device.

The plate 41 includes a slot 47 to allow the electric eye lens 40 to receive light regardless of the position of adjustment of the plate 41. Also, an opening 48 through the plate 41 corresponds to the opening 36 in the support 25 around the sunshade 37 and the camera lens 38. The opening 48 is slightly elliptical, as may be seen in FIGURE 10, with its major axis longitudinally of the plate 41, so that limited sliding movement of the plate 41 relative to the support 25 is permitted without obstructing the camera lens.

The housing 26 of the multiple-image device is carried by the plate 41 at its central portion. The housing 26 includes a rear wall 49 overlying the plate 41 and provided with a rectangular opening 50. With the opening 50 being rectangular, the marginal portions of the wall 49 engage the outer edge of the sunshade 37. Where the sunshade is of the type that is spring loaded to an axially extended position, the portions of the wall 49 around the opening 50 compress the sunshade inwardly to its retracted position (see FIGURE 4). This permits the multiple-image device to be located very close to the lens, which is a desirable design feature. The longer dimension of the rectangular opening 50 is in the horizontal direction so that there will be no obstruction of the lens 38 even though there is adjustment longitudinally of the plate 41 relative to the support 25.

Figure 8:
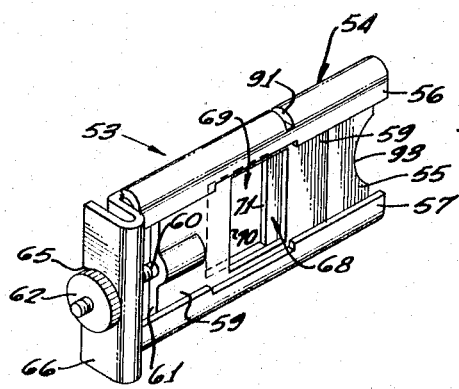
FIGURE 8 is a perspective view of the slider assembly removed from the remainder of the multiple-image device.
Figure 9:
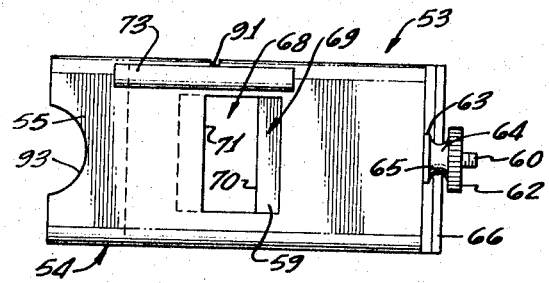
FIGURE 9 is a rear elevational view of the slider assembly.

Extending parallel to the forward wall 52 and the rearward wall 49 of the housing is a slider or mask assembly 53. This assembly 53, which is shown separated from the other components of the invention in FIGURES 8 and 9, includes an elongated channel member 54 having a flat wall 55 and flanges 56 and 57 doubled over its longitudinal marginal portions. The flanges 56 and 57 are parallel to the wall 55 and closely spaced from it, thereby defining a track. This receives a mask element 59 that is slidable relative to the member 54. Movement of the mask element 59 is accomplished through a screw-type adjustment that includes a stud 60 extending longitudinally outwardly from the end 61 of the member 59 to be engaged by a knurled nut 62. The latter member includes an inner flange portion 63 and an intermediate part 64 of reduced diameter. A slot 65 is provided in the doubled-over end portion 66 of the member 54, receiving the intermediate portion 64 of the nut 62, with the flange 63 on the inside. Consequently, the nut 62 is axially fixed so that rotation of the nut 62 will cause the stud 60, and hence the mask member 59, to move relative to the member 54.

A rectangular opening 68 is provided in the mask member 59, while a corresponding rectangular opening 69 is formed in the wall 55 of the member 54. The opening 68 has a vertical side edge 70 that overlaps the opening 69. Similarly, the opposite vertical side edge 71 of the opening 69 overlaps the opening 68 in the member 59. The edges 70 and 71 are made exactly parallel. The openings 68 and 69 cooperate to define a resulting aperture for light to pass through the mask assembly.

On the rearward side of the wall 55 of the member 54 of the slide assembly, adjacent its top edge, is secured a longitudinally extending tube 73. A rod 74 extends through the tube and is attached to it. The rod extends beyond the tube 73 through closely fitted openings in the side walls 75 and 76 of the housing 26. On the right-hand end of the rod 74, as the device is viewed from the front and in the top sectional view of FIGURE 4, beyond the end of the slide assembly 53, the rod 74 carries a button 77. On the opposite end portion of the rod, between the wall 75 and the end of the tube 73, is a compression spring 78. Hence, by pressing on the button 77, the rod 74, and the slider assembly 53 connected to it, may be moved relative to the housing 26 in opposition to the spring force. The side walls 75 and 76 are provided with openings 79 and 80 through which the slider assembly extends, permitting the movement of the slider. The confines of the openings 79 and 80, as well as the bottom wall 81 of the housing 26, define a rectilinear path of movement for the assembly 53, transverse to the lens 38.

Located above the slider assembly 53 in the housing 26 is a detent 82 that holds the slider 53 in one of its positions. The detent 82, which may be seen alone in FIGURE 5, includes a generally V-shaped spring member 83, the apical portion of which rests on a ledge 84 in the housing. A U-shaped member 85 has an upper portion 86 folded over the lower leg of the spring 83, the two legs of the member 85 receiving a trigger rod 87 having a button 88 at its outer end. The trigger extends out of the housing 26 through a slot 89 in the side wall 75. The spring 83 biases the lower leg 90 of the member 85 downwardly into engagement with the top longitudinal edge of the slider assembly 53. This edge of the slider is provided with a notch 91 that is adapted to receive the bottom edge of the leg 90 of the member 85.

The actuation of the slider assembly is such that, when in the position of FIGURE 2, it may be moved longitudinally to the left as the device is illustrated in that view by pushing inwardly on the button 77 of the rod 74. The slider 53 moves horizontally until the notch 91 reaches the lower leg 90 of the member 85. When this occurs, the spring 83 forces the leg 90 into the notch, stopping the slider assembly 53 in the position of FIGURE 6. Thus, the notch and leg 90 of the detent 82 hold the slider assembly 53 in a predetermined location after the button 77 has been pressed inwardly. This is in opposition to the force of the spring 78 which biases the slider in the opposite direction.

With the slider assembly thereby being held in the position of FIGURE 6, the button 88 of the trigger 87 may be pressed upwardly, lifting the leg 90 of the detent 82 out of the notch 91. When this occurs, the spring 78 snaps the slider assembly to the right, back to the position of FIGURE 2. The rectilinear horizontal movement of the slider assembly 53 under the influence of the spring 78 continues until the right-hand end of the tube 73 engages the inner surface of the wall 76 of the housing 26. This serves as a stop to limit the movement of the slider to the right, so that again it reaches a predetermined position (see FIGURE 4). It may be noted that, when the slider assembly 53 is in the second position of FIGURES 2 and 4, the arcuate recess 93 in the end of the wall 55 of the slider assembly provides a clearance so that the lens 40 of the electric eye of the camera is not obstructed.

When the slider assembly 53 is in the left-hand position of FIGURE 6, the edge 71 of the opening through the slider reaches substantially the midpoint of the lens 38. In other words, the edge 71 falls along the vertical diameter of the lens. Consequently, the slider, when in the position of FIGURE 6, obstructs the right-hand portion of the lens as it is viewed in that figure, while the left-hand section of the lens is open. The opposite edge 70 of the opening through the slider clears the lens and has no effect upon it. Therefore, as the lens is seen in FIGURE 6, its entire left-hand part is unobstructed, while the right-hand portion is blocked.

Conversely, when the slider is moved to the alternate position where the end of the tube 73 is brought against the wall 76, as seen in FIGURES 2 and 4, the right-hand side of the lens as illustrated in those figures is exposed and the left-hand side is blocked off. This is because the edge 70 of the opening through the slider than falls along the same diameter of the lens as did the edge 71 in the previous position. The slider, therefore, will mask first one side and then the other of the lens.

The device of this invention is used to create a multiple-image picture by tripping the shutter with the slider in its two set positions. Exposures are taken separately on the two halves of the frame of the photographic film in this manner. In the usual instance, therefore, the slider initially will be shifted to the position of FIGURE 6 by pressing inwardly on the button 77 at the end of the rod 74. The object whose picture is to be taken then will be positioned in what is the right-hand portion of the expected picture as seen from the view finder 95. Therefore, when the camera shutter is tripped, light entering the housing 26 through the elongated rectangular opening 96 in the front wall 52 will be incident upon only half of the film plate behind the lens 38. Because of the masking of one half of the lens, only one half of the film behind the lens will be exposed.

Upon completion of the initial exposure of half of the film, the button 88 is lifted to release the detent 82, so that the element 90 no longer fits in the notch 91 permitting the spring 78 to shift the slider to the second position of FIGURE 2. Again, when the shutter is tripped, light enters the housing through the opening 96, this time reaching the film by passing through the other half of the lens. In this manner, therefore, the second half of the film plate is exposed.

The opening 96 is more than twice the width of the effective opening through the mask assembly, so that it does not interfere with the light to the lens as the two exposures are made. The housing 26 obstructs other light, however, so only the light passing through the effective mask opening will reach the lens. The close fit of the slider assembly in the openings through the sides of the housing 26 helps assure that appreciable light will not enter the housing other than at its forward opening 96.

Figure 11:
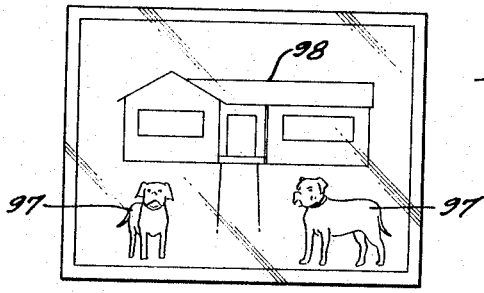
FIGURE 11 is an illustration of a typical photograph taken with the multiple-image device of this invention.

Obviously, the same object may be positioned first for one half of the frame and then for the other as the two exposures are taken. The result is a picture in which the same object appears twice, permitting unusual shots to be taken. The action of the movable mask is automatic, assuring its two set positions through simple manipulation of the buttons 77 and 88. The device will take novelty shots for amusing and challenging humorous pictures and also pictures for commercial purposes where, for a display or the like, the same object should appear with a common background in two different positions. There will be absolutely no line of demarcation between the two sections of the negative when exposed. The developed picture will have exactly the same appearance as one taken in the conventional way except that the multiple-image effect will have been realized. The background will be continuous and uninterrupted, with only the repitition of the object photographed to show that the picture is out of the ordinary. An example of the type of picture possible is found in FIGURE 11, where the same dog 97 appears on both sides of the photograph. The house 98 and other parts of the background are continuous and uninterrupted across the picture.

The adjustable mask element 59, which can be moved through the rotation of the nut 62 relative to the member 54, permits a fine adjustment to assure that a line between the two negatives will not appear under any circumstances. It compensates for any error that might be built into the device by which the edges 71 and 70 would not exactly register at the same line in the two positions of the slider assembly 53. Through the adjustment of the mask member 59, it can be assured that the edge 70 always will be positioned properly when the trigger assembly is released and the slide assembly moves. The objective is to assure that the opposite edges 71 and 70 of the effective opening through the slide assembly will reach the same location in the two positions of the slide assembly. Therefore, it is necessary only to adjust one edge of that opening, which in the design shown is the edge 70 of the mask member 59.

The portion of the mask member 59 beyond the edge 70 actually performs no function insofar as the taking of the multiple-image picture is concerned. However, it gives stability to the masked member 59, helping to guide it accurately relative to the member 54, so that the edge 70 is held parallel to the opposite edge 71 of the opening.

This invention permits the picture to be divided other than equally when such is desired. This comes about through movement of the plate 41 relative to the support 25. Movement of the member 41 adjusts the entire multiple-image device bodily relative to its support, and hence relative to the lens of the camera. This means that, upon shifting the member 41 from the central position illustrated, the edges 71 and 70 will no longer fall upon a diameter of the lens. They will, however, fall upon a chord of the lens and again will reach the same position when the slide assembly is moved, because their relationship is not changed by the shifting of the housing 26 on its support 25. It is possible through this movement, therefore, to expose different proportions of the lens in the two shots to be taken, which could be one-third of the lens and, consequently, one-third of the photographic frame to be exposed in one picture and two-thirds in the next shot. One thing that this permits is for a person, for example, to be shown standing in one portion of the negative, while he is lying down or sitting down in the second portion which occupies a greater width of the resulting picture. Thus, this added adjustment increases the versatility and usefulness of the design of this invention.

It can be seen that this multiple-image device attaches easily to the camera and is usable with existing cameras without modification to them. It is simple to operate, moving automatically to its alternate position upon tripping of the trigger. Also, it is adapted for low cost mass production and can be made largely of plastic. Nevertheless, the results are precise, and a perfect multiple-image picture can be achieved with an indiscernible division between the two sections of the picture. The device not only adds to the enjoyment of the use of the camera but also can be usable for commercial purposes in multiple-object illustrations.

The foregoing detailed description is to be clearly understood as given by way of illustration and example only, the spirit and scope of this invention being limited solely by the appended claims.

I claim:

1. In combination with a camera having a lens for transmitting light to an area of photographic film within said camera, a multiple-image device comprising
   a housing having a front wall and a back wall,
   means positioning said housing on said camera with said back wall adjacent said lens,
      said front and back walls having openings therethrough for transmitting light through said housing to said lens,
   a mask in said housing,
   means guiding said mask for rectilinear movement relative to said housing,
   a detent for holding said mask in a first position relative to said housing,
   a stop for limiting the movement of said mask from said first position to a second position,
   and resilient means biasing said mask to said second position,
      said mask having an opening therethrough, said opening having opposed parallel edges,
         said edges falling along substantially the same imaginary line chordal with respect to said lens in said two positions of said mask for thereby alternately blocking light from said lens on either side of said imaginary line in said two positions of said mask.

2. A device as recited in claim 1 including
means for adjusting the position of said housing laterally with respect to said lens
   for thereby varying the location of said imaginary line and the portions of said lens obstructed in said two positions of said mask.

3. A device as recited in claim 1 in which
said mask includes a movable portion defining one of said edges of said aperture,
and means for adjusting said movable portion relative to the remainder of said mask for causing said edge of said aperture to fall along said imaginary line.

4. In combination with a camera having a forward portion having a front face, a back face, and side edges and a lens in said front face for transmitting light into said camera to an area of photographic film therein, a multiple-image device comprising a substantially U-shaped support,
        said support having a principal portion fitting over said front face,
        and side portions extending over said side edges of said forward portion of said camera,
            said side portions having means for gripping said forward portion of said camera for holding said support thereon,
        said principal portion of said support having an opening therethrough around said lens,
    a housing carried by said support,
        said housing having a front wall and a back wall, and side walls interconnecting said front and back walls,
            said front and back walls having openings therethrough substantially aligned with said lens for permitting light to pass through said housing to said lens while said housing obstructs substantially all other light from reaching said lens,
    a mask assembly in said housing and extending outwardly therefrom through said side walls thereof,
        said housing including guide means for permitting said mask assembly to move in a fixed rectilinear path transversely of said forward portion and lens of said camera, said mask assembly including stop means for engagement with fixed portions of said housing for limiting the amount of such movement in one direction to provide a first position for said mask assembly.
    a spring biasing said mask assembly in said one direction,
    and a spring-pressed detent for holding said mask assembly in a second position remote from said first position,
        said detent including actuating means exteriorly of said housing for permitting release of said detent for causing said mask assembly to move in said one direction to said first position under the influence of said spring,
    said mask assembly having an aperture therethrough,
        said aperture having opposite parallel edges, said edges being in registry with an imaginary line chordal of said lens when said mask assembly is in said first and second positions,
            whereby said aperture through said mask assembly permits light to pass through portions of said lens on opposite sides of said imaginary line when said mask assembly is in said first and second positions, respectively.

5. A device as recited in claim 4 in which
said mask assembly includes a notch in one surface thereof,
said detent including a spring-pressed member bearing against said surface of said mask assembly and dimensioned to enter said notch when said mask assembly reaches said second position.

6. A device as recited in claim 4 in which
said mask assembly has an adjustable portion for varying the position of one of said edges relative to the other of said edges,
and means for moving said adjustable portion of said mask assembly including
    a stud projecting laterally outwardly from said adjustable portion in the direction of said path of rectilinear movement,
    a nut threadably engaging said stud,
    and means fixing said nut against axial movement relative to the remainer of said mask assembly,
        whereby rotation of said nut causes axial movement of said stud and hence adjustment of said adjustable portion.

7. A device as recited in claim 6 in which said mask assembly includes
opposed portions defining a track,
    said adjustable portion of said mask assembly including opposite edges received in said opposed portions,
        for thereby guiding said adjustable portion in a fixed rectilinear path relative to the remainder of said mask assembly.

8. A device as recited in claim 4 in which said mask assembly includes
a tube on one side thereof,
a rod extending through said tube and projecting outwardly therefrom,
    said rod extending through said side walls of said housing,
    one end of said tube constituting said stop means of said mask assembly for limiting the movement of said mask assembly upon engagement of said tube with the adjacent side wall of said housing,
    said resilient means comprising a compression spring circumscribing said rod between the opposite end of said tube and the opposite side wall of said housing.

References Cited by the Examiner
UNITED STATES PATENTS

| | | | |
|---|---|---|---|
| 536,105 | 3/1895 | Stowell | 95—36 |
| 1,533,433 | 4/1925 | Linden | 95—36 |
| 1,591,484 | 7/1926 | Grieves | 95—36 |
| 2,421,746 | 6/1947 | Duffy | 95—36 |

JOHN M. HORAN, *Primary Examiner.*